Jan. 21, 1969  L. H. BALLARD ET AL  3,423,185
GAUZE CATALYST SUPPORT

Filed Jan. 2, 1964  Sheet __1__ of 2

Louis H. Ballard
Buddy L. Satterley
  INVENTORS

BY
ATTORNEY

Louis H. Ballard
Buddy L. Satterley
INVENTORS

United States Patent Office 3,423,185
Patented Jan. 21, 1969

3,423,185
GAUZE CATALYST SUPPORT
Louis H. Ballard and Buddy L. Satterley, Texas City, Tex., assignors to Monsanto Company, St. Louis, Mo., a corporation of Delaware
Filed Jan. 2, 1964, Ser. No. 335,230
U.S. Cl. 23—288                                    7 Claims
Int. Cl. B01j 9/04; C01c 3/02

ABSTRACT OF THE DISCLOSURE

A support for a metallic gauze catalyst in a reactor for manufacturing hydrogen cyanide, comprising a layer of ceramic blocks with vertical passages and having horizontal ridges on the upper side, and a superimposed layer of ceramic blocks having greater than 50% cross-sectional open area and having narrow upper areas for contact with the gauze.

---

Figure 1:
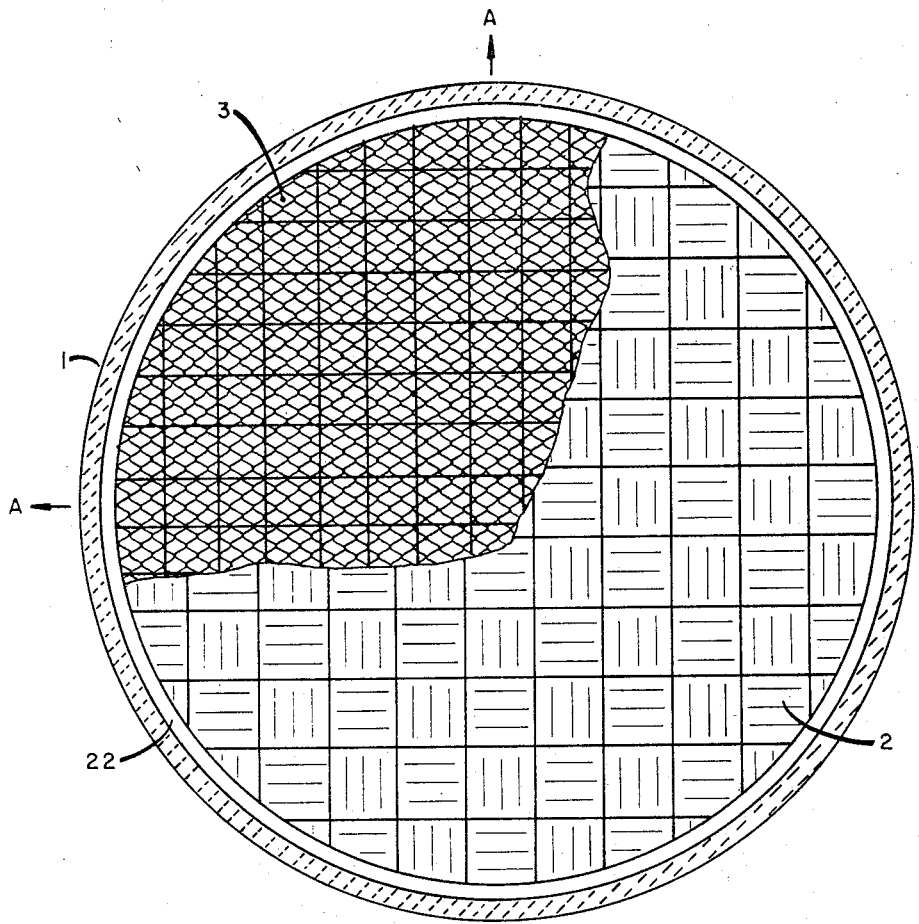

This invention pertains to an improved apparatus for use in catalytic processes. More especially, it relates to a new and novel support apparatus for a metallic gauze catalyst in the production of hydrogen cyanide.

The use of metallic catalysts in the form of gauzes is well known. An example of such catalysts is the platinum and/or platinum-rhodium gauze used in the manufacture of hydrogen cyanide and nitric oxide. This type of catalyst is highly efficient and generally superior to other forms of the same catalytic metals. Lab size reactors are ideally suited for using these gauzes since the span of the reactor is small and little difficulty is encountered in providing support for the gauzes. For example, the gauze can frequently be clamped in place between flanges. In such installations, platinum embrittlement frequently occurs but goes unobserved due to short on-stream times.

With an increase in size in the reactor, however, the gauze catalyst support becomes a problem. Attempts have been made to circumvent the problems presented by the use of rods or beams of silica, quartz, or ceramics to support the gauze. Some of these arrangements require electrical heating elements and other accessories to minimize platinum embrittlement. Other devices or techniques, while successful in commercial reactors up to three feet in diameter, cannot be used in reactors having diameters in excess of this size. For example, the unique catalyst structure of conically shaped multilayered wire gauze with the circular edge at the base attached to a metal mounting section for a catalyst support described in U.S. Patent 2,552,279 is limited, by cost and tendency to sag, to reactors of approximately three feet in diameter or less. Similarly limited is the scheme in U.S. Patent 2,607,663 which claims a metal gauze catalyst of several layers to form a pack and discloses fastening the metal gauze pack on the edges to fit into a reaction chamber supporting the pack and forming a gas-tight seal at the periphery. Because there are no internal supports, the use of this technique is obviously useless in reactors having diameters in excess of about three feet.

It has been found that for large-scale production of hydrogen cyanide, i.e., in the order of 20,000,000 pounds per year or more, the internal diameter of the reactor must be approximately six feet or more. No device which holds gauze catalyst packs by clamping the edges lends itself as a practical means of holding and maintaining such catalyst packs in a reactor greater than approximately three feet in diameter because the gauze would sag and break or be torn from the edges in a very short time due to the extreme weakness of platinum at temperatures from 750° C. to 1250° C.

There are other substantial problems created in translating reactors using gauze catalyst packs to commercial sizes of approximately six feet in diameter or more. Large differential expansions are encountered between the gauze and the support beneath the gauze whether it be a screen, metallic rods or the more massive ceramic supports. Massive metal supports, for example, are practically impossible because of these differential thermal expansions. Even ceramic supports must be carefully engineered for these problems. Furthermore, the reactions in the manufacture of hydrogen cyanide, nitric oxide, and like catalytic reactions occur at temperatures from 750° C. to 1250° C., a range in which the strength of structural metals and other construction materials is very limited.

In addition, metallic materials, especially those containing nickel, cobalt or iron, are notorious poisoning agents for the platinum catalyst and act as catalysts for the decomposition of hydrogen cyanide which cause decreased reaction efficiency and mechanical failure. Even touching of the platinum gauze with human hands often leaves sufficient foreign material to drastically lower conversion. Any massive support may also cause specific areas of the gauze to be blocked from contact with the full flow of the reactants, resulting in localized cooling and deposition of carbon. Such a gauze catalyst loses efficiency in these localized areas and finally breaks. Platinum can also undergo reactions with hydrocarbons to form brittle platinum carbides. This is especially true under the conditions of the hydrogen cyanide reaction. In addition to these considerations, a commercial reactor for the production of the products above must provide convenience of catalyst replacement and uniformity of pressure drop for an even flow distribution. Likewise, a means to maintain the gauze in place during flow surges is also needed.

Some attempts have been made to overcome these problems. For example, U.S. Patent No. 2,750,266 claims a catalytic reactor for the production of hydrogen cyanide utilizing a flat catalyst gauze. The support in this case for the catalyst gauze comprises one central water-cooled metallic beam supporting carborundum bars thereon, with a network of nickel-chromium-iron alloy strips reposing on the bars upon which the gauze catalyst rests. This, however, is not practical in reactors with internal diameters of approximately six feet and greater because of the limited strength of the alloy strips and carborundum bars of the length required. U.S. Patent 3,073,685 discloses a support structure consisting of a nickel-chromium screen on top of radially supported ceramic rods, but here again the nickel-chromium screen acts as a catalyst poison and causes the decomposition of hydrogen cyanide so the highest efficiency from the gauze catalyst pack cannot be realized.

Thus, there exists an urgent need in the art for a support for a platinum gauze catalyst pack in a reactor for the production of hydrogen cyanide that does not limit the size of the reactor, does not poison or reduce efficiency of the catalyst and does not block any significant portion of the gauze catalyst area so as to cause carbonization and breaking of the gauze catalyst.

It has now been discovered that a support constructed in a particular configuration of a non-poisoning ceramic material and having a multiplicity of minimum area contact points or edges in contact with the gauze catalyst will result in greatly improved conversions and yields of hydrogen cyanide when reacting methane with ammonia and will not cause carbonization or mechanical failure of the gauze catalyst.

It is an object, therefore, of this invention to furnish a support for a metallic gauze catalyst employed in the manufacture of hydrogen cyanide that does not limit the size of the reactor. It is a further object to provide a catalyst support which is non-poisoning to a platinum gauze catalyst. Another object is to provide a method for supporting platinum gauze catalysts to eliminate the severe sagging and breaking of the gauze catalyst in large diameter reactors. Another object to this invention is to provide a catalyst support for a platinum gauze catalyst in which carbon embrittlement of the catalyst due to blocking of reactant flow therethrough is eliminated or minimized. It is a still further object of this invention to provide a catalyst support for a platinum gauze catalyst which results in an increase in yield and conversion of hydrogen cyanide when reacting ammonia and methane at elevated temperatures. These and other objects of the invention will become apparent from the following description drawings and appended claims.

According to the present invention, there is provided a grate for supporting metallic gauze catalysts in a reactor in which ammonia and methane are reacted to produce hydrogen cyanide, said grate comprising a number of horizontally arranged ceramic blocks with holes therethrough for the passage of reactant gases, the upper part of said grate comprising catalyst contact means for supporting said gauze catalyst in said reactor in minimum surface contact with said grate and the lower part of said grate comprising a gas-distribution means for uniformly distributing reactant gas across the cross-section of said reactor. The catalyst contact part of said grate preferably provides narrow, longitudinally extended areas for contact with the gauze catalyst; however, if desired, point contact areas may be also be used. The longitudinally extended areas in contact with the gauze catalyst may be either straight, curved or irregular in horizontal cross-section. The horizontal distance between the surfaces in contact with the gauze catalyst must be as small as possible to reduce the stress on the gauze while providing maximum open area for flow of reactant gases. The horizontally arranged ceramic blocks, preferably of alumina, may be constructed with the catalyst contact means as the upper part of each block and the gas distributing means as the lower part of each block; however, in a preferred embodiment, the catalyst contact means and the gas distributing means are separate horizontally arranged ceramic blocks positioned one on top of the other. The preferred configuration of the catalyst contact means in this embodiment is as a honeycomb horizontal cross-section and the preferred configuration of the gas distribution means has both the catalyst contact means and the gas distribution means as part of each block so as to provide minimum contact area between the blocks comprising the catalyst contact means and the gas distributing means.

Figure 5:
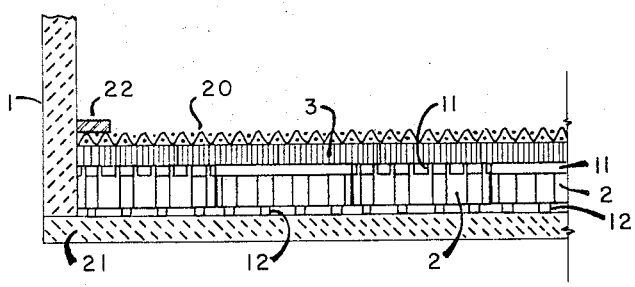
Figure 2:
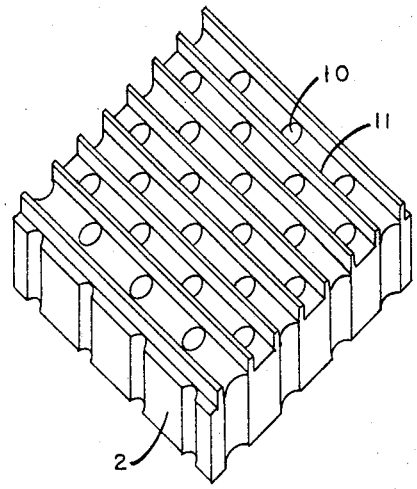
Figure 3:
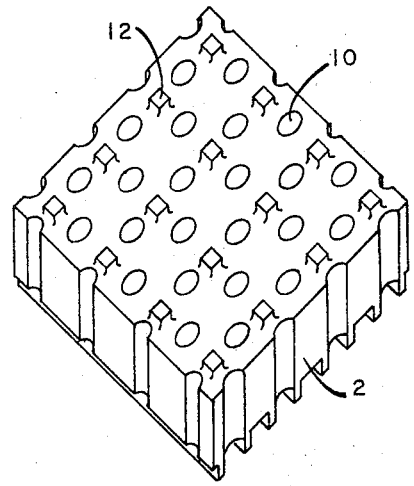
Figure 4:
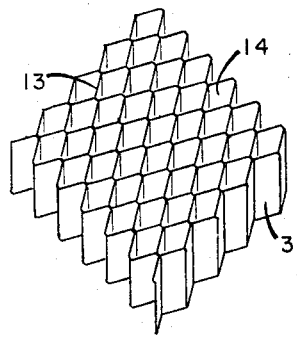

This invention will be readily understood from the attached drawings. FIGURE 1 is a plan view of the gauze catalyst support apparatus or grate as it is installed in the reactor. FIGURE 2 is an isometric view of the top of a block used as the gas distribution part of the grate and FIGURE 3 is an isometric view of the bottom of the same block. FIGURE 4 is an isometric view of a block having a honeycomb cross-section and used as the catalyst contact part of the grate. FIGURE 5 is a cross-sectional view of the reactor taken along lines A—A in FIGURE 1 showing the separate honeycomb-type catalyst contact means supporting the platinum gauze catalyst on the gas distribution means.

Referring now to FIGURE 1, the gauze catalyst support grate is enclosed by reactor wall 1 consisting of a circle of fire brick. Alumina gas distribution means 2 is more fully described in FIGURES 2 and 3 and comprises ceramic blocks about eight inches square placed so that the horizontal ridges of adjacent blocks are perpendicular to each other. Catalyst contact means 3 is likewise divided into individual alumina blocks having a honeycomb cross-section and dimensions of about six inches square. Catalyst contact means 3 are positioned on top of gas distribution means 2. The gauze catalyst (not shown) is then placed on top of catalyst contact means 3 and is held down by metallic ring 22 at the periphery of the reactor.

In FIGURES 2 and 3, ceramic block 2 is shown in more detail. Referring to FIGURE 2, each block 2 has a number of circular holes 10 therethrough for the passage of reactant gases and in the case of blocks of eight inches square in dimension, holes 10 may be about ¾ inch in diameter on about 1¼ inch centers. Horizontal ridges 11 may be on about one inch centers or less and may have from about $\frac{1}{16}$ inch to about ¼ inch width at the top. Ridges 11 can conveniently be about ½ inch high. Referring to FIGURE 3 showing the bottom view of a gas distribution block 2, holes 10 are as shown and described in FIGURE 2. The gas distribution blocks are supported on the floor of the reactor by feet 12 which in the case of eight inch square blocks are about ¾ inch square and are located on about 1¼ inch centers with a vertical height of about ½ inch or as high as necessary to provide for free flow of reactant gases beneath the alumina blocks.

FIGURE 4 shows one design of ceramic block 3 having a honeycomb cross-section which serves as a catalyst contact means. The catalysts contact blocks are about six inches square and about one inch high, but may be less, for instance, about ½ inch, if the strength of the ceramic material is sufficient. Support members 13 are curved in shape but may be designed to form squares, circles, diamonds or any other pattern that furnishes adequate structural strength to the block. The thickness of support members 13 are preferably from about $\frac{1}{64}$ inch to about $\frac{1}{32}$ inch and as narrow as possible based on the strength required. Holes 14 are formed between support members 13 and are irregular in horizontal cross-section with a maximum width of about ¼ inch in the design depicted in FIGURE 4, but may be larger or smaller if desired, preferably, from about ⅛ inch to about ½ inch in diameter.

Referring now to FIGURE 5, the blocks of gas distribution means 2 are shown resting on reactor floor 21 and supported by feet 12. Horizontal ridges 11 of gas distribution blocks 2 are shown in perpendicular relationship between adjacent blocks. The blocks of catalyst contact means 3 rest on top of horizontal ridges 11 of gas distribution means 2. Gauze catalyst 20 is placed on top of catalyst contact means 3 and hold-down ring 22 seals gauze catalyst 20 against wall 1 of the reactor.

The improvements resulting from the use of the catalyst support grate of this invention are exemplified by, but not limited to, the following examples.

EXAMPLE I

In a commercial reactor of approximately six feet in diameter used in the production of hydrogen cyanide, a 9-layer gauze catalyst pack consisting of 90% platinum and 10% rhodium was installed on a support structure consisting of a nickel-chromium screen resting on silicon carbide rods as described in U.S. Patent 3,073,685. A reactant mixture comprising ammonia, natural gas and air in proportions such that air is present in excess of the stoichiometric quantities and the ratio of methane to ammonia is slightly less than 1:1 was passed through the 9-layer gauze catalyst at a temperature in the range of 1100° C. to 1150° C. at a total flow rate of between 35,000 and 40,000 lbs./hr. In a run averaging about 500 hours, the average conversion to hydrogen cyanide was determined to be 57% and the average yield of hydrogen cyanide based on ammonia was calculated to be 72%. The life of the gauze catalyst on the nickel-chromium screen support was found to be from 2,000 to 2,500 hours.

EXAMPLE II

In a commercial reactor used for the production of hydrogen cyanide identical to the reactor of Example I, a 9-layer catalyst gauze pack consisting of 90% platinum and 10% rhodium was installed on a support consisting of eight-inch alumina blocks of the configuration shown in FIGURES 2 and 3 as the gas distribution means with six-inch alumina blocks of honeycomb cross-section as the catalyst contact means, shown in FIGURE 4, on top of the gas distribution blocks and the gauze catalyst pack resting on the catalyst contact means. The alumina blocks employed as the gas distribution means lie on the bottom of the reactor which consists of several inches of poured sillimanite having holes therethrough for passage of the reactant gases into the tubes of a heat exchanger. The reactor bottom may be any ceramic material which will withstand the high temperatures without breaking. A reactant mixture comprising ammonia, natural gas and air in the same proportions as those used in Example I was passed through the 9-layer gauze catalyst at a temperature in the range of 1100 to 1150° C. and at a total flow rate of approximately 40,000 lbs./hr. In a run of approximately 500 hours duration, the average conversion to hydrogen cyanide was determined to be 65% and the average yield of hydrogen cyanide based on ammonia was found to be 78%. The expected life of the gauze catalyst pack is calculated to be in excess of 5,000 hours.

It is apparent from the examples above to those skilled in the art that the novel gauze catalyst support grate of this invention results in surprising increases in yield and conversion when reacting ammonia and methane to produce hydrogen cyanide and, in addition, the life of the gauze catalyst is extended considerably over the maximum life previously obtained by the best known gauze catalyst support. The combination of alumina gas distribution blocks and alumina catalyst contact blocks of honeycomb cross-section on top, as described in the drawings and exemplified in the examples, is a vastly improved gauze catalyst support over those disclosed in the prior art and commonly used. However, many other combinations within the scope of this invention can be employed.

As an example of another embodiment of this invention, the ceramic block serving as the gas distribution means described in the drawings, may serve as both the catalyst contact means and the gas distribution means. Thus, only one set of horizontally arranged ceramic blocks are required.

The catalyst support grate of this invention must have sufficient cross-sectional open area as to not substantially restrict the flow of reactant gases and usually will have greater than 50% open area, preferably greater than 70% open area. Also, the support grate of this invention must have minimum contact area at each contact point between the gauze catalyst pack and the support grate. In addition, when using the honeycomb-type catalyst contact blocks, the gas distribution blocks must be designed with a minimum contact area between the gas distribution blocks and honeycomb contact blocks so that the number of openings or holes in the honeycomb catalyst contact blocks closed by the ridges of the gas distribution blocks is at a minimum. Otherwise, the restriction to the flow of reactants is too large and catalyst efficiency and life are decreased.

To provide for maximum efficiency of the gauze catalyst and to prevent breaking and tearing, it is necessary that the above factors be accommodated when designing a gauze catalyst support grate in accordance with this invention. Too little open area will prevent maximum catalyst efficiency of the gauze catalyst from being obtained and the blocking of the flow either by an extended surface upon which the gauze catalyst pack rests or by blocking of a portion of the hole area beneath the catalyst contact blocks of the support grate will result in carbonization of the gauze catalyst which not only decreases catalyst efficiency in the reaction of ammonia and methane to form hydrogen cyanide, but also causes tearing and breaking of the catalyst pack itself.

Inasmuch as the open area of the gauze catalyst support grate is a very important consideration, the thickness of the edges or points of the catalyst contact blocks supporting the gauze catalyst pack is likewise extremely important. For instance, when using the honeycomb type structure exemplified by the examples and shown in the drawings, the support edges should be no thicker than about $\frac{1}{25}$ inch and as thin as about $\frac{1}{100}$ inch if the strength of the material will permit. The holes in the honeycomb structure may likewise be varied over a wide range. For instance, any size hole from about $\frac{1}{16}$ inch to as much as about one inch may be employed although it is important that the individual open area for holes not be so big as to allow the gauze catalyst pack to sag to any considerable extent. Thus, the preferred size of the holes in the honeycomb structure should be no larger than about $\frac{1}{2}$ inch in the largest dimension.

The horizontal ridges of the gas distribution blocks upon which the honeycomb catalyst contact blocks rest should likewise be as narrow as possible within the limits of the strength of the material so that a minimum number of the holes in the honeycomb structure are blocked in the overlap of the horizontal ridges of the blocks. If the gas distribution blocks are used separately without the honeycomb catalyst contact blocks, the ridges should also be as narrow as possible so as to minimize the area of contact of the gauze catalyst. These horizontal ridges should, therefore, be from about $\frac{1}{32}$ inch to not more than about $\frac{1}{4}$ inch wide. The height of the horizontal ridges of the blocks is relatively unimportant just as long as there is room for flow of the reactant gases beneath the catalyst contact blocks or the gauze catalyst pack along the length of the horizontal ridges. This would call for a height of about $\frac{1}{8}$ inch to as much as 1 inch above the surface of the holes through the blocks. The feet of the blocks are designed to hold the blocks above the floor of the reactor and allow cross-flow of the reactant gases in all directions as the gases pass through the holes in the blocks. To permit adequate flow, the feet of the blocks must be at least $\frac{1}{4}$ inch high, but may be as high as several inches, for instance, 2 or 3 if required for the flow characteristics of the process.

Although the honeycomb catalyst contact blocks may be of the same horizontal dimensions as the gas distribution blocks, preferably they are of different sizes. Usually, the honeycomb catalyst contact blocks will be smaller than the gas distribution blocks but, if desired, they can also be larger in horizontal dimensions.

The catalyst support grate of this invention is preferably constructed of a high purity alumina which should be in excess of 90% purity and preferably above 95% purity. The advantage of using high purity alumina instead of a nickel-chromium screen or high temperature stainless steel which has much the same characteristics as the nickel-chromium is apparent from the examples. High purity alumina eliminates poisoning of the catalyst and has been found to be superior in this regard to any other type of ceramic material. However, when using other ceramic materials in the support grate disclosed herein, such materials as silicon dioxide, silica aluminum, various grades of mullite and silicon carbide are superior to nickel-chromium or stainless steel, but nevertheless do not give the greatly improved results obtained when using high purity alumina.

The hold-down ring at the outer edge of the reactor which may be free-floating is installed to eliminate leakage of the reactant gases along the edge of the reactor where it is difficult to obtain a tight fit with the gauze catalyst pack itself. This holddown ring may be manufactured of any material which is substantially inert with respect to the reactant gases, and provided it does not affect the gauze catalyst and can withstand the extremely high temperatures present during the reaction while maintaining requisite strength. In this case, the various ceramic materials may be used or a nickel-chromium alloy or a stainless steel material can be used since the harmful effect these metallic materials may have on the edge of the gauze catalyst pack is relatively minor.

The gauze catalyst support grate of this invention is adaptable to any size reactor in which the support surface is horizontal. For instance, a reactor of anywhere from 1 to 30 feet in diameter can very advantageously employ the gauze catalyst support grate of this invention. The direction of flow of reactant gases is usually downwardly; however, the catalyst support grate can be used with gas flow in the upward direction just as easily.

What is claimed is:

1. An apparatus for support of a metallic gauze catalyst in a reactor used in the catalytic manufacture of hydrogen cyanide which comprises (a) gas-distributing means comprising a first set of horizontally arranged, footed ceramic blocks resting on a floor of heat-resistant ceramic material in said reactor, said ceramic blocks having vertically extending openings for the passage of gas therethrough and a multiplicity of substantially horizontal parallel ridges extending above the main body thereof, said blocks being arranged with the parallel ridges of adjacent blocks perpendicular to each other; and (b) catalyst contacting means comprising a second set of horizontally arranged ceramic blocks superimposed and resting upon the parallel ridges of said first set of ceramic blocks, said second set of ceramic blocks having greater than 50% cross-sectional open area and having narrow longitudinally extended areas for contact with said catalyst.

2. The apparatus of claim 1 wherein said ceramic blocks are constructed of alumina of a purity in excess of 95%.

3. The apparatus of claim 2 wherein said second set of horizontally arranged ceramic blocks are blocks having a honeycomb horizontal cross section.

4. The apparatus of claim 3 wherein said blocks in said second set of horizontally arranged ceramic blocks are smaller in horizontal dimensions than are the blocks in said first set.

5. The apparatus of claim 4 wherein the reactor used in the catalytic manufacture of hydrogen cyanide is from about one foot to about 30 feet in diameter.

6. The apparatus of claim 4 wherein the gauze catalyst is held down by a free-floating metallic ring at the external edges of said gauze catalyst.

7. The apparatus of claim 4 wherein said honeycomb structure has open areas which are in the shape of a diamond.

References Cited

UNITED STATES PATENTS

| | | | |
|---|---|---|---|
| 1,722,339 | 7/1929 | Pauling | 23—288 XR |
| 2,843,592 | 7/1958 | Ludwig et al. | 23—288 |
| 2,899,286 | 8/1959 | Miller | 23—288 |
| 3,073,685 | 1/1963 | Grove et al. | 23—288 |

FOREIGN PATENTS

| | | |
|---|---|---|
| 801,806 | 9/1958 | Great Britain. |

JOSEPH SCOVRONEK, *Primary Examiner.*

U.S. Cl. X.R.

23—151, 284